United States Patent [19]

Faler et al.

[11] Patent Number: 4,950,731
[45] Date of Patent: Aug. 21, 1990

[54] METHOD FOR PREPARING SPIROBIINDANE POLYCARBONATES

[75] Inventors: Gary R. Faler; Jerry C. Lynch, both of Scotia, N.Y.

[73] Assignee: General Electric Company, Schenectady, N.Y.

[21] Appl. No.: 40,528

[22] Filed: Apr. 20, 1987

[51] Int. Cl.$^5$ ............................................. C08G 64/20
[52] U.S. Cl. ................................... 528/201; 528/196; 528/198; 528/199; 528/200
[58] Field of Search ............... 528/201, 198, 199, 200, 528/196

[56] References Cited

U.S. PATENT DOCUMENTS

| | | | |
|---|---|---|---|
| 4,368,315 | 1/1983 | Sikdar | 528/198 |
| 4,471,105 | 9/1984 | Campbell et al. | 528/198 |
| 4,495,345 | 1/1985 | Kawakami et al. | 528/201 |
| 4,515,936 | 5/1985 | Sikdar et al. | 528/198 |
| 4,552,949 | 11/1985 | Mark | 528/201 |

OTHER PUBLICATIONS

Condensed Chemical Dictionary; Eighth Edition; 1971; p. 448.
Stueben, *J. Poly. Sci., Part A,* 3, 3209–3217, (1965).

*Primary Examiner*—Harold D. Anderson
*Attorney, Agent, or Firm*—William H. Pittman; James C. Davis, Jr.

[57] ABSTRACT

Homo- and copolycarbonates of spirobiindane bisphenols are prepared by first reacting phosgene with a substantially pure spirobiindane bisphenol in the presence of aqueous base in a heterogeneous medium at a pH in the range of about 9–11, and subsequently adding an interfacial polycarbonate formation catalyst and, optionally, a dihydroxyaromatic compound and a chain termination agent and continuing phosgene passage at a pH of at least about 10. By this method, there may be prepared homo- and copolycarbonates of 6,6'-dihydroxy-3,3,3',3'-tetramethyl-1,1-spiro(bis)indane having high molecular weight. Said homopolycarbonates and copolycarbonates with bisphenol A may be used for manufacture of optical disks having low birefrigence.

18 Claims, 1 Drawing Sheet

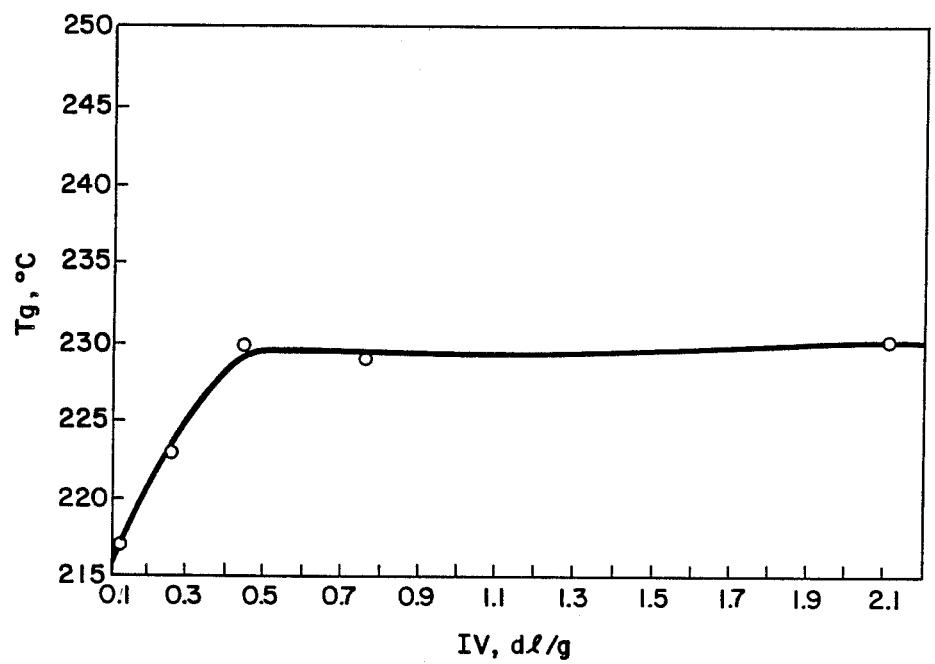

METHOD FOR PREPARING SPIROBIINDANE POLYCARBONATES

This invention relates to spirobiindane polycarbonates, including both homo- and copolycarbonates. In particular, it relates to such polycarbonates having a high and uniform glass transition temperature and low birefringence, as well as a method of preparation thereof.

The preparation of polycarbonates from spirobiindane bisphenols, particularly 6,6'-dihydroxy-3,3,3',3'-tetramethyl-1,1'-spiro(bis)indane (hereinafter "SBI"), is known in the art. Reference is made, for example, to Stueben, *J. Poly. Sci., Part A*, 3, 3209–3217 (1965), and U.S. Pat. No. 4,552,949. It has been found, however, that the polycarbonates prepared as described therein have inconsistent, erratic properties. For example, the SBI homopolycarbonate prepared by the Stueben method has a glass transition temperature of 237° C., while that produced in accordance with the aforementioned patent has a glass transition temperature of 207.2° C.

Further studies have shown that such properties as the molecular weights and glass transition temperatures of SBI polycarbonates are dependent to a large extent on the purity of the SBI monomer used in their preparation. Most known methods for preparing SBI yield a highly impure product. The first disclosure of substantially pure SBI suitable for preparing uniform polycarbonates is in copending, commonly owned application Ser. No. 917,644, filed Oct. 10, 1986. However, that highly pure material, when converted to a homopolycarbonate by the method of Stueben, yields a product with a still lower molecular weight and glass transition temperature (52,600 and 222° C., respectively) than that obtained from the monomer produced according to the Stueben method (85,200 and 237° C., respectively).

Among the problems leading to these inconsistent results is the insolubility of spirobiindane bisphenols in reaction systems commonly used for interfacial polycarbonate formation, such as mixtures of water and methylene chloride. As a result of this insolubility, homopolycarbonate formation is excessively slow and erratic. On the other hand, the formation of copolycarbonates with other common bisphenols such as bisphenol A results in incorporation of extremely low levels of the spirobiindane bisphenol by reason of its minimal solubility.

The present invention is based on the discovery of a method whereby spirobiindane homo- and copolycarbonates may be prepared reliably and uniformly. Products of extremely high molecular weight may be obtained. Alternatively, a predetermined lower molecular weight polycarbonate may be prepared by incorporation of effective amounts of a conventional chain termination agent.

In addition, the invention provides SBI homopolycarbonates having high molecular weights and glass transition temperatures falling within a sharply defined temperature range. Finally, it has been discovered that the optical properties of SBI homopolycarbonates and certain copolycarbonates of SBI and bisphenol A are advantageous for the preparation of optical disks.

In one of its aspects, the present invention is a method for preparing a linear polycarbonate containing structural units derived from a spirobiindane bisphenol which comprises the steps of:

(A) preparing a heterogeneous mixture in which the aqueous phase has a pH in the range of about 9–11, said mixture consisting essentially of an aqueous alkali metal or alkaline earth metal base solution; a substantially pure spirobiindane bisphenol of the formula

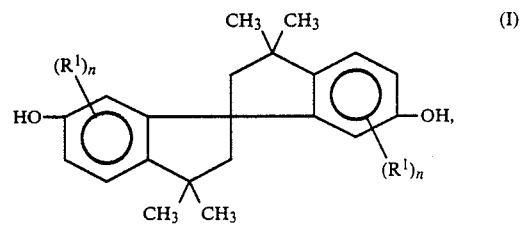

wherein each $R^1$ is independently $C_{1-4}$ primary or secondary alkyl or halo and n is from 0 to 3, or a mixture thereof with at least one other dihydroxyaromatic compound; and a chlorinated aliphatic hydrocarbon in which said spirobiindane bisphenol or mixture is substantially insoluble;

(B) passing phosgene into said mixture at a temperature in the range of about 10–50° C. while maintaining the pH of the aqueous phase at a value up to about 11, until maximum homogeneity is attained;

(C) adding an effective amount of an interfacial polycarbonate formation catalyst and continuing phosgene passage at a temperature in the range of about 10°–50° C. and a pH of the aqueous phase of at least about 10; and (D) recovering the linear polycarbonate from the reaction mixture.

The polycarbonates which may be prepared by the method of this invention are those containing units derived from SBI and various alkyl- or halo-substituted analogs thereof, especially those in which n is 1 or 2 and R is methyl, chloro or bromo. The preferred spirobiindane bisphenol is SBI.

Both homo- and copolycarbonates may be prepared. For the copolycarbonates, there is additionally employed a second dihydroxyaromatic compound of the formula

wherein $A^1$ is a divalent aromatic radical. Such radicals include aromatic hydrocarbon and substituted aromatic hydrocarbon radicals, with illustrative substituents being alkyl, cycloalkyl, alkenyl (e.g., crosslinkable-graftable moieties such as allyl), halo (especially fluoro, chloro and/or bromo), nitro and alkoxy.

The preferred $A^1$ values have the formula

wherein each of $A^2$ and $A^3$ is a monocyclic divalent aromatic radical and Y is a bridging radical in which one or two atoms separate $A^2$ from $A^3$. The free valence bonds in formula II are usually in the meta or para positions of $A^2$ and $A^3$ in relation to Y.

In formula III, the $A^2$ and $A^3$ values may be unsubstituted phenylene or substituted derivatives thereof wherein the substituents are as defined for $A^1$. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated $C_{1-12}$ aliphatic or alicyclic radical such as methylene, cyclohexylmethylene, [2.2.1]bicycloheptylmethylene, ethylene, ethylidene, 2,2-propylidene, 1,1-(2,2-dimethylpropylidene), cyclohexylidene, cyclopentadecylidene, cyclododecylidene or 2,2-adamantylidene, especially an alkylidene radical. Aryl-substituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group.

For the most part, the suitable compounds include biphenols and especially bisphenols. Frequent reference will be made to bisphenols hereinafter, but it should be understood that other compounds equivalent thereto may be employed as appropriate.

The following dihydroxyaromatic compounds are illustrative:
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-)3-hydroxyphenyl) propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(2,3,5,6-tetramethyl-4-hydroxyphenyl)-propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)-propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Ethylene glycol bis(4-hydroxyphenyl) ether
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
6-Dihydroxydibenzothiophene
2,7-Dihydroxycarbazole.

Bisphenol A (in which Y is isopropylidene and $A^2$ and $A^3$ are each p-phenylene) is preferred for reasons of availability and particular suitability for the purposes of the invention.

The spirobiindane bisphenol used in the method of this invention should be substantially pure. For present purposes, a product is considered substantially pure if it is SBI having an absorbance at 350 nanometers of at most 0.06, preferably at most 0.03, as measured on a solution of 1 gram thereof in 100 ml. of spectroscopic grade methanol, using a path length of 10 cm., or is an analogous or homologous spirobiindane bisphenol of similar purity.

A method for the preparation of substantially pure spirobiindane bisphenols is disclosed in the aforementioned copending application Ser. No. 917,644, the disclosure of which is incorporated by reference herein. It comprises the steps of:

(1) reacting at least one of bisphenols of the formula

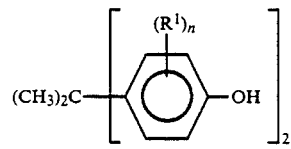

and isopropenylphenols of the formula

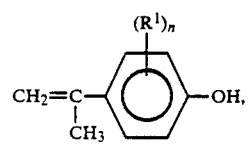

wherein $R^1$ and n are as previously defined, by contact at a temperature in the range of about 100°-200° C. (preferably about 125°-174° C.) with at least one acidic catalyst selected from the group consisting of alkanesulfonic acids and polyvalent metal halides which are strong Lewis acids (the preferred catalyst being methanesulfonic acid), thereby producing a crude spirobiindane bisphenol;

(2) removing a major proportion of the by-products including phenols of the formula

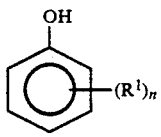

and 1-(4-hydroxyphenyl)indanols of the formula

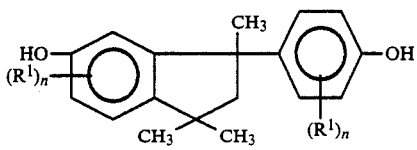

from the crude spirobiindane bisphenol, typically by water washing and/or steam distillation followed by extraction with a solvent such as methylene chloride; and (3) further purifying the product of step 2 by dissolution in a mixture of methanol and methylene chloride followed by precipitation by addition of water.

This method is illustrated by the following example. All percentages are by weight.

EXAMPLE 1

A mixture of 1 kilogram of bisphenol A and 50 grams of methanesulfonic acid was heated at 135° C. for 3 hours, during which time it became molten. The molten mixture was poured into 2 liters of water, with stirring, and the precipitated solids were filtered and washed with an additional 2 liters of water. The filtration residue was heated under reflux for 1 hour with 1.5 liters of methylene chloride. The mixture was cooled to −5° C. and filtered, and the residue was washed with an additional liter of cold methylene chloride. Analysis of the product at this point by high pressure liquid chromatography showed it to be 98.5% pure SBI.

The product was dissolved in a mixture of 1 liter of methanol and 200 ml. of methylene chloride, forming a homogeneous solution. Deionized water, 1.2 liters, was added to the solution with stirring, whereupon a heterogeneous mixture was formed. This mixture was filtered and the residue washed with methylene chloride. The methylene chloride-methanol-water dissolution and precipitation step was repeated and the solid product therefrom was dried in an oven under vacuum. There was obtained 253 grams (57% of theoretical) of substantially pure SBI.

A 1-gram sample of the purified SBI was dissolved in 100 ml. of spectroscopic grade methanol and the ultraviolet absorbance at 350 nm. was determined, using a Varian 219 spectrophotometer having a path length of 10 cm. The absorbance was found to be 0.016.

In step A of the method of this invention, a heterogeneous mixture is prepared which consists essentially of the spirobiindane bisphenol or a mixture thereof with another bisphenol, an aqueous alkali metal or alkaline earth metal base solution and a chlorinated aliphatic hydrocarbon. Any desired proportion (if any) of said other bisphenol to spirobiindane bisphenol may be employed. The spirobiindane bisphenol will generally comprise about 5-95% and preferably about 35-95% of total bisphenols in the mixture.

The base is generally a hydroxide or carbonate, such as lithium, sodium, potassium or calcium hydroxide or sodium or potassium carbonate. It is most often lithium, sodium or potassium hydroxide, with sodium hydroxide being preferred because of its availability and relatively low cost.

The chlorinated aliphatic hydrocarbon is one in which the bisphenols are substantially insoluble. Illustrative hydrocarbons of this type are methylene chloride and chloroform. Methylene chloride is preferred by reason of its availability, low cost and particular suitability in the method of the invention.

The base concentration in the heterogeneous mixture is adjusted to provide a pH of the aqueous phase at a value up to about 11, most often about 9-11 and preferably about 10-11. The volume ratio of organic to aqueous phase is generally in the range of about 1.0-1.5:1.

In step B, phosgene is passed into the heterogeneous mixture at a temperature in the range of about 10°-50° C., preferably about 25°-40° C. The pH is maintained in the above-stated range during phosgene addition, which is continued until maximum homogeneity is attained. By "maximum homogeneity" is meant a point at which no further solids are observed to dissolve in the aqueous-organic system. At this point, it is common for the mixture to be cloudy but no substantial proportion of solids will be observed. It may be advantageous, under certain conditions, to introduce bisphenol into the reaction mixture periodically during step B.

It is believed that the principal constituents of the mixture at the conclusion of step B are monochloroformates and bischloroformates, including those of the spirobiindane bisphenol. There may also be present some corresponding oligomer species in which bisphenol moieties are connected by carbonate groups, as well as a small proportion of unreacted bisphenol.

In step C, an effective amount of an interfacial polycarbonate formation catalyst is added and phosgene passage is continued. If a copolycarbonate is desired, at least one other bisphenol may also be added at this stage if it was not present during steps A and B.

The compounds suitable as interfacial polycarbonate formation catalysts are those known in the art and include tertiary amines, quaternary ammonium and phosphonium salts and amidines. The tertiary amines are particularly useful; they generally comprise those which are oleophilic Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate is essential for the formation of the polycarbonate. For the most part, such amines contain at least about 6 and preferably about 6-14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of polycarbonates.

Step C is conducted at a temperature in the range of about 10°–50° C. and preferably about 25°–50° C., and at a pH of at least about 10, most often in the range of about 10–14 and preferably about 11–12.5. The amount of catalyst used is most often in the range of about 0.25–3.0 and preferably about 0.5–1.5 mole percent based on total dihydroxyaromatic compound.

It is also within the scope of the invention to employ in step C an effective amount of a monohydroxyaromatic compound, such as phenol, t-butylphenol, octylphenol, nonylphenol or p-cumylphenol, as a chain termination agent to regulate molecular weight of the polycarbonate. The amount thereof depends on the desired molecular weight and molecular weight distribution of the product, and is most often about 1–10 mole percent based on total dihydroxyaromatic compound.

Step D is the recovery of the linear polycarbonate from the reaction mixture. It may be achieved by conventional methods such as precipitation with a non-solvent.

By the method of this invention, there may be obtained spirobiindane homo- and copolycarbonates having substantially higher molecular weights then those previously disclosed. It is known in the art that glass transition temperature (Tg) values increase with increasing molecular weight up to a maximum value and then remain constant as molecular weight increases further. Thus, another aspect of the invention is SBI homopolycarbonates having a glass transition temperature within the range from 225° to about 230° C. Said homopolycarbonates are also characterized by very high molecular weight.

According to the Stueben paper previously cited, a homopolycarbonate having a "reduced viscosity" of 0.75 was obtained by relatively conventional interfacial polymerization. It should be noted that the "reduced viscosity" parameter is not equivalent to intrinsic viscosity (IV), which is much lower at comparable molecular weight. The aforementioned U.S. Pat. No. 4,552,949 describes a similarly prepared SBI homopolycarbonate having a Tg of 207.2° C.

By contrast, homopolycarbonates with Tg values up to about 230° C. have been obtained according to the present invention. Thus, the homopolycarbonates obtained from the SBI of this invention have substantially higher molecular weights than those disclosed in the prior art Reference is now made to the drawing which is a graph in which Tg value for SBI homopolycarbonate is plotted against IV. It will be seen that there is a relatively steady increase in Tg from 215° C. at an IV of 0.1 dl./g. to 230° C. at 0.4 dl./g. Further increases in IV are accompanied by virtually no change in Tg. It is also readily apparent that the homopolycarbonate of U.S. Pat. No. 4,552,949 had a molecular weight much too low to compare to those obtained from the compositions of this invention.

The following examples illustrate the preparation of high molecular weight homopolycarbonates and copolycarbonates according to the method of this invention.

EXAMPLE 2

To a mixture of 9.86 grams (32.1 mmol.) of SBI prepared substantially as described in Example 1, 75 ml. of methylene chloride and 60 ml. of deionized water was added 50% aqueous sodium hydroxide solution in an amount to adjust the pH of the aqueous phase to 11. Phosgene was passed into the mixture at 0.4 gram per minute, with stirring. When 25%, 50% and 75% (respectively) of the theoretical amount of phosgene for bischloroformate formation had been added, three additional 9.86-gram portions of SBI (total 128.4 mmol.) were introduced and phosgene addition was continued.

After the final addition of SBI, 3.01 ml. of a 0.525 M triethylamine solution in methylene chloride (1.6 mmol. of triethylamine) was added and phosgene addition was continued. When the amount of phosgene added was 130% of theoretical, the mixture was diluted with 200 ml. of methylene chloride and the organic phase was separated and washed with 3% aqueous hydrochloric acid solution and deionized water. Acetone, 10 ml., was added and the mixture was agitated in a Waring blender with the addition of 250 ml. of methanol. The precipitated SBI homopolycarbonate was filtered and dried in an oven at 100° C.

The properties of the polymer obtained, in comparison to two controls, are given in Table I. Weight average molecular weights were determined by gel permeation chromatography relative to polystyrene.

TABLE I

|  | Ex. 2 | Control A | Control B |
|---|---|---|---|
| SBI prepn. method | Ex. 1 | Ex. 1 | Stueben |
| Polycarbonate prepn. method | Ex. 2 | Stueben | Stueben |
| Mw | 611,000* | 52,600 | 85,000 |
| IV, dl./g. | 1.41 | 0.296 | 0.353 |
| Tg, °C. | 230 | 222 | 237 |

The molecular weight for the product of Example 2 is marked with an asterisk because it is only an approximation, having been determined on an apparatus calculated to read accurately only up to about 100,000. It is apparent, however, from the molecular weight and IV values that the polymer of Example 2 had a much higher molecular weight than those of the controls.

It is also apparent from the Tg value of 237° for the product of Control B that it does not represent a typical SBI homopolycarbonate, since the highest obtainable Tg value is normally about 230° C. The high molecular weight and Tg value for this polymer are believed to be evidence of some form of branching or crosslinking, possibly involving impurities in the SBI sample. It is therefore evident that the homopolycarbonate of the present invention has a much higher molecular weight than previously known linear SBI homopolycarbonates.

EXAMPLE 3

The procedure of Example 2 was repeated, except that phenol in the amount of 1 mole percent based on SBI was added concurrently with the triethylamine. The resulting SBI homopolycarbonate had a weight average molecular weight of 70,800. Its glass transition temperature was 230° C., the same as that of the product of Example 2.

In a control experiment, a conventional interfacial polymerization was attempted. To a mixture of 39.45 grams (128 mmol.) of SBI, 75 ml. of methylene chloride, 60 ml. of deionized water, 1.29 mmol. of triethylamine as a 1.05 M solution in methylene chloride and 3.2 mmol. of phenol as a 0.534 M solution in methylene chloride was added 50% aqueous sodium hydroxide solution to adjust the pH of the aqueous phase to 11. The mixture was stirred for 5 minutes after which phosgene was added at 0.4 gram per minute to a total amount of 130% of theoretical. The pH of the aqueous phase was maintained at about 11 during phosgene addition. During the addition, the mixture became a gelatinous mass and stirring became impossible. Attempted isolation of product was also impossible, because of emulsion formation.

EXAMPLE 4

To a mixture of 11.33 grams (36.8 mmol.) of SBI, 65 ml. of methylene chloride and 55 ml. of deionized water was added 50% aqueous sodium hydroxide solution in an amount to adjust the pH of the aqueous phase to 11. Phosgene was passed into the mixture for 10 minutes, with stirring, at 0.8 gram per minute. The reaction vessel was then purged with nitrogen and there were added 15.59 grams (68.3 mmol.) of bisphenol A, 2.65 mmol. of phenol as a 0.534 M solution in methylene chloride and 1.05 mmol. of triethylamine as a 0.494 M solution in methylene chloride. The mixture was stirred vigorously for 5 minutes, after which phosgene addition at 0.8 gram per minute was resumed for 12 minutes, with the pH being maintained at about 11 by addition of sodium hydroxide solution. At the end of this time, a considerable increase in solution viscosity was observed.

The mixture was diluted with 200 ml. of methylene chloride and worked up as described in Example 2. There was obtained a copolycarbonate containing 35 mole percent SBI units; it had a weight average molecular weight of 49,300 and a glass transition temperature of 181° C.

EXAMPLES 5-8

The procedure of Example 4 was repeated, varying the proportions of SBI and bisphenol A to produce several copolycarbonates. The properties of the products are listed in Table II.

TABLE II

| Example | Mole % SBI | Mw | Tg, °C. |
|---|---|---|---|
| 5 | 30 | 48,100 | 164 |
| 6 | 40 | 45,400 | 188 |
| 7 | 50 | 44,800 | 193 |
| 8 | 75 | 52,100 | 218 |

EXAMPLE 9

To a mixture of 24 grams (77.9 mmol.) of SBI, 75 ml. of methylene chloride and 65 ml. of deionized water was added 50% aqueous sodium hydroxide solution in an amount to adjust the pH of the aqueous phase to 10. Phosgene was passed into the mixture for 30 minutes, with stirring, at 0.52 gram per minute with maintenance of the pH at 10. The reaction vessel was then purged with nitrogen and there were added 1 ml. each of 0.779 M solutions of phenol and triethylamine in methylene chloride The mixture was stirred for 5 minutes while maintaining the pH at 10, during which time a substantial viscosity increase was observed. Phosgene addition at 0.52 gram per minute was resumed for 8 minutes, with the pH again being maintained at about 10 by addition of sodium hydroxide solution The mixture was diluted with 100 ml. of methylene chloride and worked up as described in Example 2. There was obtained an SBI homopolycarbonate having a weight average molecular weight of 57,700 and an intrinsic viscosity (in chloroform at 25° C.) of 0.352 dl./g.

EXAMPLE 10

To a mixture of 9.86 grams (32 mmol.) of SBI, 7.31 grams (32 mmol.) of bisphenol A, 37 ml. of methylene chloride and 30 ml. of deionized water was added 50% aqueous sodium hydroxide solution in an amount to adjust the pH of the aqueous phase to 10. Phosgene was passed into the mixture for 15.7 minutes, with stirring, at 0.8 gram per minute as the pH was maintained at 10. The reaction vessel was then purged with nitrogen and there were added 1 ml. each of 0.64 M solutions in methylene chloride of phenol and triethylamine. The mixture was stirred vigorously for 5 minutes while maintaining the pH at 10, during which time a viscosity increase was observed, after which phosgene addition at 0.8 gram per minute was resumed for 1.6 minutes, with the pH again being maintained at about 10 by addition of sodium hydroxide solution. At the end of this time, a considerable increase in solution viscosity was observed.

The mixture was diluted with 100 ml. of methylene chloride and worked up as described in Example 2. There was obtained a copolycarbonate containing 50 mole percent SBI units; it had a weight average molecular weight of 99,580 and an intrinsic viscosity (in chloroform at 25° C.) of 0.68 dl./g.

The spirobiindane bisphenol polycarbonates prepared by the method of this invention are characterized by high heat distortion temperatures and resistance to oxidation and photoinitiated degradation, coupled with low melt viscosities. These properties make them superior for many applications to polyester-polycarbonates such as bisphenol A polycarbonate-isophthalate-terephthalate. The latter also have high heat distortion temperatures; however, they are difficult to process because of their extremely high melt viscosities. They are also subject to photoinitiated and oxidative degradation under relatively mild conditions.

A particularly advantageous property of SBI polycarbonates is their low orientational birefringence as compared, for example, to bisphenol A homopolycarbonate. This property permits the fabrication of optical disks, potentially including erasable-rerecordable disks, from said SBI polycarbonates.

Data on optical disks is read by a plane polarized laser beam, associated with a similar reference beam polarized in a perpendicular direction. For accurate reading, it is necessary to minimize phase retardation of these laser beams upon passage through the disk. One factor directly affecting retardation is the birefringence of the disk, i.e., the difference between indices of refraction of light polarized in two directions perpendicular to each other.

Birefringence has several components, caused by such factors as molecular structure and degree of molecular orientation. "Orientational" birefringence of a polymer, ideally measured after perfect orientation of all polymer molecules by stretching, is a function solely of molecular structure. Approximate measurements of orientational birefringences of several polymers, for the purpose of comparison, may be made on samples which have been injection molded under substantially identical conditions.

An illustrative series of birefringence measurements conducted on various polycarbonates in accordance with these principles gave results in Table III.

TABLE III

| Mole % Bisphenol A | Mole % SBI | Birefringence × 10³ |
|---|---|---|
| 100 | 0 | 2.06 |
| 50 | 50 | 1.37 |
| 25 | 75 | 0.34 |
| 0 | 100 | 0 |

By reason of their low orientational birefringences, the SBI polycarbonates offer much more latitude in design of disks and disk reading equipment than does bisphenol A homopolycarbonate.

Therefore, another aspect of the present invention is an article of manufacture which is an optical disk comprising a polycarbonate having low birefringence, said polycarbonate consisting essentially of structural units of the formula

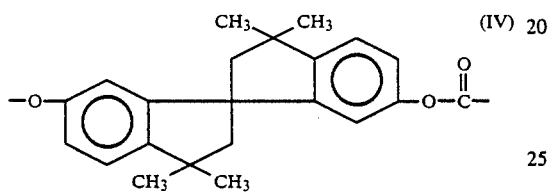

and about 0-60 mole percent of structural units of the formula

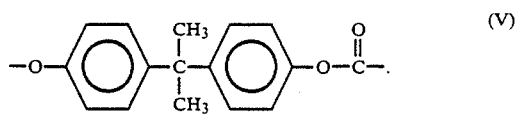

What is claimed is:

1. A method for preparing a linear polycarbonate containing structural units derived from a spirobiindane bisphenol which comprises the steps of:

(A) preparing a heterogeneous mixture in which the aqueous phase has a pH in the range of about 9-11, said mixture consisting essentially of an aqueous alkali metal or alkaline earth metal base solution; a substantially pure spirobiindane bisphenol of the formula

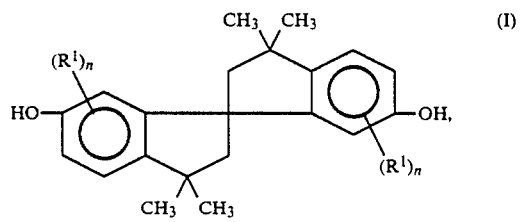

wherein each $R^1$ is independently $C_{1-4}$ primary or secondary alkyl or halo and n is from 0 to 3, or a mixture thereof with at least one other dihydroxyaromatic compound; and a chlorinated aliphatic hydrocarbon constituting an organic phase in which said spirobiindane bisphenol or mixture is substantially insoluble;

(B) passing phosgene into said mixture at a temperature in the range of about 10°-50° C. while maintaining the pH of the aqueous phase at a value up to about 11, until maximum homogeneity is attained;

(C) adding an effective amount of an interfacial polycarbonate formation catalyst and continuing phosgene passage at a temperature in the range of about 10°-50° C. and a pH of the aqueous phase of at least about 10; and (D) recovering the linear polycarbonate from the reaction mixture.

2. A method according to claim 1 wherein n is 0, the spirobiindane bisphenol has an absorbance at 350 nanometers of at most 0.06 as measured on a solution of 1 gram thereof in 100 ml. of spectroscopic grade methanol, using a path length of 10 cm, the chlorinated aliphatic hydrocarbon is methylene chloride and the base is sodium hydroxide.

3. A method according to claim 2 wherein in step B the pH of the aqueous phase is maintained in the range of about 10-11 and the temperature is in the range of about 25°-40° C.

4. A method according to claim 3 wherein the volume ratio of organic to aqueous phase in step A is in the range of about 1.0-1.5:1.

5. A method according to claim 4 wherein step C is conducted at a temperature in the range of about 25°-50° C. and at a pH in the range of about 10-14.

6. A method according to claim 5 wherein the interfacial polycarbonate formation catalyst is triethylamine and the proportion thereof is in the range of about 0.25-3.0 mole percent based on total dihydroxyaromatic compound, and the chlorinated hydrocarbon is methylene chloride.

7. A method according to claim 6 wherein the spirobiindane bisphenol has an absorbance at 350 nanometers of at most 0.03 as measured on a solution of 1 gram thereof in 100 ml. of spectroscopic grade methanol, using a path length of 10 cm and the amount of catalyst is in the range of about 0.5-1.5 mole percent based on total dihydroxyaromatic compound.

8. A method according to claim 2 wherein there is also introduced during step A or step C a second dihydroxyaromatic compound of the formula $$HO-A^1-OH, \qquad (II)$$

wherein $A^1$ is a divalent aromatic radical.

9. A method according to claim 8 wherein $A^1$ has the formula $$-A^2-Y-A^3-, \qquad (III)$$

wherein each of $A^2$ and $A^3$ is a monocyclic divalent aromatic radical and Y is a bridging radical in which one or two atoms separate $A^2$ from $A^3$, and the spirobiindane bisphenol comprises about 5-95% of total dihydroxyaromatic compounds in the mixture.

10. A method according to claim 9 wherein $A^2$ and $A^3$ are each p-phenylene and Y is isopropylidene.

11. A method according to claim 10 wherein the volume ratio of organic to aqueous phase in step A is in the range of about 1.0-1.5:1.

12. A method according to claim 11 wherein step C is conducted at a temperature in the range of about 25°-50° C. and at a pH in the range of about 10-14.

13. A method according to claim 12 wherein the interfacial polycarbonate formation catalyst is triethylamine and the proportion thereof is in the range of about 0.25-3.0 mole percent based on total dihydroxyaromatic compound, and the chlorinated hydrocarbon is methylene chloride.

14. A method according to claim 13 wherein the spirobiindane bisphenol has an absorbance at 350 nanometers of at most 0.03 as measured on a solution of 1 gram thereof in 100 ml. of spectroscopic grade methanol, using a path length of 10 cm.; and the amount of catalyst is in the range of about 0.5–1.5 mole percent based on total dihydroxyaromatic compound.

15. A method according to claim 2 wherein there is also added during step C an effective amount of a monohydroxyaromatic compound as a chain termination agent.

16. A method according to claim 15 wherein the chain termination agent is phenol and it is present in the amount of about 1–10 mole percent based on total dihydroxyaromatic compound.

17. A method according to claim 9 wherein there is also added during step C an effective amount of monohydroxyaromatic compound as a chain termination agent.

18. A method according to claim 17 wherein the chain termination agent is phenol and it is present in the amount of about 1–10 mole percent based on total dihydroxyaromatic compound.

* * * * *